United States Patent
Ozaki et al.

(10) Patent No.: US 9,934,571 B2
(45) Date of Patent: Apr. 3, 2018

(54) IMAGE PROCESSING DEVICE, PROGRAM, IMAGE PROCESSING METHOD, COMPUTER-READABLE MEDIUM, AND IMAGE PROCESSING SYSTEM

(71) Applicant: FUJI XEROX CO., LTD., Tokyo (JP)

(72) Inventors: Ryota Ozaki, Yokohama (JP); Noriji Kato, Yokohama (JP); Yukio Kumazawa, Yokohama (JP); Ryoko Usuba, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 385 days.

(21) Appl. No.: 14/407,158

(22) PCT Filed: Mar. 29, 2013

(86) PCT No.: PCT/JP2013/059678
§ 371 (c)(1),
(2) Date: Dec. 11, 2014

(87) PCT Pub. No.: WO2014/030380
PCT Pub. Date: Feb. 27, 2014

(65) Prior Publication Data
US 2015/0187077 A1    Jul. 2, 2015

(30) Foreign Application Priority Data

Aug. 23, 2012 (JP) ................................. 2012-184106

(51) Int. Cl.
G06K 9/00 (2006.01)
G06T 7/00 (2017.01)
(Continued)

(52) U.S. Cl.
CPC ........ *G06T 7/0042* (2013.01); *G06K 9/00127* (2013.01); *G06T 7/0012* (2013.01); *G06T 7/11* (2017.01); *G06T 7/60* (2013.01); *G06T 7/73* (2017.01); *G06T 2207/10056* (2013.01); *G06T 2207/20081* (2013.01); *G06T 2207/30024* (2013.01)

(58) Field of Classification Search
None
See application file for complete search history.

(56) References Cited

U.S. PATENT DOCUMENTS

| 7,346,200 B1 * | 3/2008 | Tsipouras | G01N 1/312 382/128 |
| 2006/0072805 A1 * | 4/2006 | Tsipouras | G01N 1/312 382/134 |

(Continued)

FOREIGN PATENT DOCUMENTS

| JP | 4346923 B2 | 7/2009 |
| WO | 0049391 A1 | 8/2000 |

(Continued)

OTHER PUBLICATIONS

Written Opinion for PCT/JP2013/059678 dated Jul. 2, 2103 [PCT/ISA/237].

(Continued)

*Primary Examiner* — Matthew Bella
*Assistant Examiner* — Jose M Torres
(74) *Attorney, Agent, or Firm* — Sughrue Mion, PLLC

(57) ABSTRACT

An image processing device 20 acquires captured images obtained by imaging a sample including a target cell, sets an object region for detecting the target cell in the captured images, extracts a plurality of cell regions each including a cell from a peripheral region including a region other than the object region, sets a range of a feature quantity of the target cell based on a feature quantity obtained from each of the plurality of cell regions, and determines whether or not the target cell is included in the object region when the feature quantity obtained from the object region is included in the set range of the feature quantity.

10 Claims, 11 Drawing Sheets

(51) Int. Cl.
*G06T 7/60* (2017.01)
*G06T 7/73* (2017.01)
*G06T 7/11* (2017.01)

(56) References Cited

U.S. PATENT DOCUMENTS

| | | | |
|---|---|---|---|
| 2010/0074506 A1* | 3/2010 | Yamada | G01N 1/312 382/133 |
| 2010/0080440 A1* | 4/2010 | Yamada | G01N 35/026 382/133 |
| 2010/0104169 A1* | 4/2010 | Yamada | G01N 15/1429 382/134 |
| 2010/0128988 A1 | 5/2010 | Kincaid | |
| 2010/0169811 A1* | 7/2010 | Yamada | G01N 15/1475 715/764 |
| 2010/0183216 A1* | 7/2010 | Yamada | G01N 15/1475 382/134 |
| 2011/0286654 A1* | 11/2011 | Krishnan | G06T 7/0083 382/133 |
| 2012/0262703 A1* | 10/2012 | Zahniser | G01N 15/1475 356/39 |
| 2013/0002847 A1* | 1/2013 | Zahniser | G01N 15/1475 348/79 |
| 2013/0016885 A1* | 1/2013 | Tsujimoto | G06T 5/003 382/128 |
| 2014/0092228 A1 | 4/2014 | Usuba et al. | |

FOREIGN PATENT DOCUMENTS

| | | |
|---|---|---|
| WO | 2012-091056 A1 | 7/2012 |
| WO | 2012/169088 A1 | 12/2012 |

OTHER PUBLICATIONS

Kosuke Aoki, et al., "Auto-Detection of Nucleated Red Blood Cells from Massive Microscopy Images", The Journal of the Institute of Image Electronics Engineers of Japan, 2008, vol. 37, No. 5, pp. 609 to 616.

Y. Shimizu, et al., "Detection and Retrieval of Nucleated Red Blood Cells Using Linear Subspaces", The Journal of the Institute of Image Electronics Engineers of Japan, Jan. 25, 2011, vol. 40, No. 1, p. 67-73.

Y. Shimizu, et al., "Nucleated Red Blood Cells Searching in Microscope Images", ITE Technical Report, Aug. 27, 2009 (Aug. 27, 2009), vol. 33, No. 34, pp. 1 to 2.

International Search Report for PCT/JP2013/059678 dated Jul. 2, 2013 [PCT/ISA/210].

Written Opinion for PCT/JP2013/059678 dated Jul. 2, 2013 [PCT/ISA/237].

Office Action dated Aug. 28,2015, issued by the State Intellectual Property Office of the People's Republic of China in counterpart Chinese Patent Application No. 201380038139.9.

Davis, et al., "Improved Network Inversion Technique for Query Learning: Application to Automated Cytology Screening", 4th Annual IEEE Symposium, IEEE Computer Society, May 12, 1991-May 14, 1991, Baltimore, Maryland, pp. 313-320, XP010024201.

Mui, et al., "Automated Classification of Nucleated Blood Cells Using a Binary Tree Classifier" IEEE Transactions on Pattern Analysis and Machine Intelligence, IEEE Computer Society, vol. PAMI-02, Issue No. 5, Sep. 1, 1980, pp. 429-443, XP002090051.

Communication issued May 11, 2016, issued by the European Patent Office in counterpart European Patent Application No. 13830872.1.

Chen, et al., "An Improved Segmentation Algorithm for Clustered Cells", Chinese Journal of Biomedical Engineering, vol. 25, Issue No. 4, Aug. 2006, pp. 390-395.

Xian-Gang, et al., "The Gaining & Analysis of Micro-Cell Image Properties", vol. 23, Issue No. 5, Journal of East China Jiaotong University, Oct. 2006, 4 pages total.

Communication issued Nov. 10, 2016, issued by the State Intellectual Property Office of the People's Republic of China in counterpart Chinese Patent Application No. 201380038139.9.

* cited by examiner

NUCLEUS CANDIDATE REGION

CELL CANDIDATE REGION

IMAGE PROCESSING DEVICE, PROGRAM, IMAGE PROCESSING METHOD, COMPUTER-READABLE MEDIUM, AND IMAGE PROCESSING SYSTEM

TECHNICAL FIELD

The present invention relates to an image processing device, a program, an image processing method, a computer-readable medium, and an image processing system.

BACKGROUND ART

Patent Literature 1 describes a technique in which cells satisfying the conditions of the color, shape, positional relationship, area ratio, and the like of NRBCs are searched from object images, thereby mechanically detecting NRBCs.

CITATION LIST

Patent Literature

Patent Literature 1: Japanese Patent No. 4346923

SUMMARY OF INVENTION

Technical Problem

An object of the invention is to provide an image processing device, a program, and an image processing system capable of determining whether or not a target cell is included by refining image candidates likely to be a target cell by a reference according to different cell features for each individual.

Solution to Problem

[1] According to an aspect of the invention, it provides an image processing device including: an acquisition unit that acquires captured images obtained by imaging a sample including a target cell; a setting unit that sets an object region for detecting the target cell in the captured images; an extraction unit that extracts a plurality of cell regions from a peripheral region including a region different from the object region; a range setting unit that sets a range of a feature quantity of the target cell based on a feature quantity obtained from each of the plurality of cell regions; and a determination unit that determines whether or not the target cell is included in the object region when a feature quantity obtained from the object region is included in the range of the feature quantity set by the range setting unit.

[2] The image processing device according to [1], may further include: a state determination unit that determines whether a cell included in each cell region extracted by the extraction unit is in a dense state or in a solitary state, in which the range setting unit sets a range of a feature quantity of the target cell for each cell state determined by the state determination unit, and the determination unit determines whether or not the target cell is included in the object region when the feature quantity obtained from the object region is included in the range of the feature quantity set by the range setting unit for the state of the cell included in the object region.

[3] The image processing device according to [1] or [2], may have a configuration in which the feature quantity is at least one of a cell area, a nucleus area, and a cell-to-nucleus area ratio, the extraction unit extracts a plurality of cell regions each including a nucleated cell from the peripheral region, and the range setting unit sets a range equal to or less than a threshold value set within the range of the feature quantity obtained from each of the plurality of cell regions as the range of the feature quantity of the target cell.

[4] The image processing device according to [1] or [2], may have a configuration in which the feature quantity is at least one of a cell area, a nucleus area, and a cell-to-nucleus area ratio, the extraction unit extracts a plurality of cell regions each including an anucleated cell from the peripheral region, and the range setting unit sets a range sandwiching an average value or a median of the feature quantity obtained from each of the plurality of cell regions as the range of the feature quantity of the target cell.

[5] The image processing device according to any one of [1] to [4], may further include: a learning unit that mechanically learns an identification condition for identifying the target cell based on sample images corresponding to a positive example and a negative example of the target cell, in which the determination unit determines whether or not the target cell is included in the object region on the basis of the identification condition when the feature quantity obtained from the object region is included in the range of the feature quantity set by the range setting unit.

[6] The image processing device of claim 6 according to any one of [1] to [5], may have a configuration in which the target cell is a nucleated red blood cell having a nucleus, the image processing device further includes: a region extraction unit that extracts a nucleus candidate region to be a candidate of the nucleus from the plurality of captured images based on at least one of the color and concentration of the nucleus, and the setting unit sets the object regions based on the nucleus candidate region and a range of possible size of and the target cell.

[7] According to another aspect of the invention, it provides a program which causes a computer to function as: an acquisition unit that acquires captured images obtained by imaging a sample including a target cell; a setting unit that sets an object region for detecting the target cell in the captured images; an extraction unit that extracts a plurality of cell regions each including a cell from a peripheral region including a region other than the object region; a range setting unit that sets a range of a feature quantity of the target cell based on a feature quantity obtained from each of the plurality of cell regions; and a determination unit that determines whether or not the target cell is included in the object region when a feature quantity obtained from the object region is included in the range of the feature quantity set by the range setting unit.

[8] According to another aspect of the invention, it provides an image processing method which causes a computer to execute a process including: acquiring captured images obtained by imaging a sample including a target cell; setting an object region for detecting the target cell in the captured images; extracting a plurality of cell regions each including a cell from a peripheral region including a region other than the object region; setting a range of a feature quantity of the target cell based on a feature quantity obtained from each of the plurality of cell regions; and determining whether or not the target cell is included in the object region when a feature quantity obtained from the object region is included in the range of the feature quantity set by the range setting unit.

[9] According to another aspect of the invention, it provides a non-transitory computer readable medium which stores a program causing a computer to execute a process for image processing, the process including: acquiring captured images obtained by imaging a sample including a target cell; setting an object region for detecting the target cell in the captured images; extracting a plurality of cell regions each including a cell from a peripheral region including a region other than the object region, setting a range of a feature quantity of the target cell based on a feature quantity obtained from each of the plurality of cell regions; and determining whether or not the target cell is included in the object region when a feature quantity obtained from the object region is included in the range of the feature quantity set by the range setting unit.

[10] According to another aspect of the invention, it provides an image processing system including: an image processing device; an optical microscope that is connected to the image processing device; and a display device that is connected to the image processing device, in which the image processing device includes an acquisition unit that acquires captured images obtained by imaging a sample including a target cell, a setting unit that sets an object region for detecting the target cell in the captured images, an extraction unit that extracts a plurality of cell regions each including a cell from a peripheral region including a region different from the object region, a range setting unit that sets a range of a feature quantity of the target cell based on a feature quantity obtained from each of the plurality of cell regions, and a determination unit that determines whether or not the target cell is included in the object region when a feature quantity obtained from the object region is included in the range of the feature quantity set by the range setting unit.

Advantageous Effects of Invention

According to the configuration (processing) described in [1], [7], [8], [9], and [10], it is possible to determine whether or not a target cell is included by refining image candidates likely to be a target cell by a reference according to different cell features for each individual.

According to the invention described in [2], it is possible to determine a target cell by refining image candidates likely to be a target cell by a reference according to the state of an object cell.

According to the invention described in [3], it is possible to set a target cell by refining image candidates likely to be a target cell by a reference set according to the feature of a nucleated cell included in a sample.

According to the invention described in [4], it is possible to set a target cell by refining image candidates likely to be a target cell by a reference set according to the feature of an anucleated cell included in a sample.

According to the invention described in [5], it is possible to determine whether or not a target cell is included in image candidates likely to be a target cell based on a reference learned in advance.

According to the invention described in [6], it is possible to set a nucleated red blood cell by refining image candidates likely to be a nucleated red blood cell by a reference according to an individual.

DESCRIPTION OF EMBODIMENTS

Figure 1:
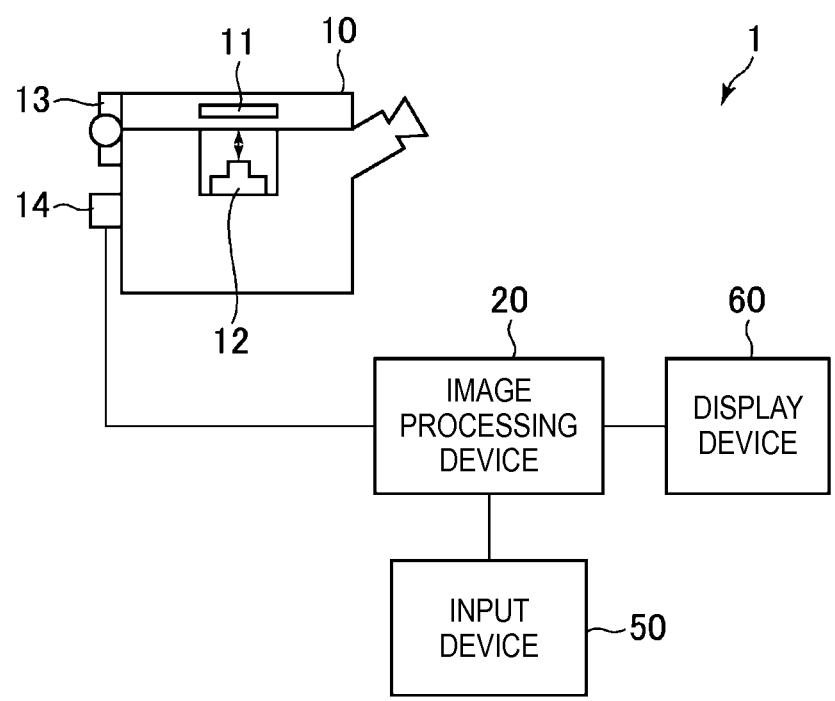
FIG. 1 is a diagram showing a system configuration example of an image processing system according to this embodiment.

Hereinafter, a mode (hereinafter, referred to as an embodiment) for carrying out the invention will be described referring to the drawings.

FIG. 1 shows a system configuration example of an image processing system 1 according to this embodiment. As shown in FIG. 1, the image processing system 1 includes an optical microscope 10, an image processing device 20, an input device 50, and a display device 60. The image processing device 20 and the optical microscope 10, the input device 50, and the display device 60 are connected to perform data communication.

The optical microscope 10 images a sample on a slide glass 11 placed on a sample stand by a CCD camera 14 through an optical system, such as an objective lens 12. The optical microscope 10 includes a focusing mechanism 13 which changes the distance between the slide glass 11 and the objective lens 12, and images the sample on the slide glass 11 at a plurality of different focal distances. In this embodiment, as the sample, a sample in which maternal blood is applied to the slide glass 11 and May-Giemsa staining is performed is used. With this, nucleated red blood cells (NRBCs) derived from a fetus in maternal blood are stained violet-blue. Hereinafter, NRBCs are called target cells.

The image processing device 20 acquires captured images obtained by imaging a sample using the optical microscope 10 and detects the target cell in the acquired captured images. At this time, the image processing device 20 sets candidate regions of the target cell in the captured images, excludes candidate regions not satisfying the condition of the target cell among the set candidate regions from the candidate regions, and subjects the remaining candidate regions to processing by an identification unit. It should be noted that the details of detection processing of the target cell in the image processing device 20 will be described below.

The input device 50 is, for example, a device, such as a keyboard or a mouse, and inputs an operation received from a user to the image processing device 20. For example, the image processing device 20 may acquire information of an image region designated by the user through the input device 50 in an image displayed on the display device 60 as learning information for learning the image features of a positive example and a negative example of the target cell or other specific cells.

The display device 60 is, for example, a liquid crystal display or the like, and displays a screen based on the result of processing by the image processing device 20. For example, the captured images imaged by the optical microscope 10, the detection result of the target cell by the image processing device 20, and the like are displayed on the display device 60.

Next, a function of the image processing device 20 according to this embodiment will be described.

Figure 2:
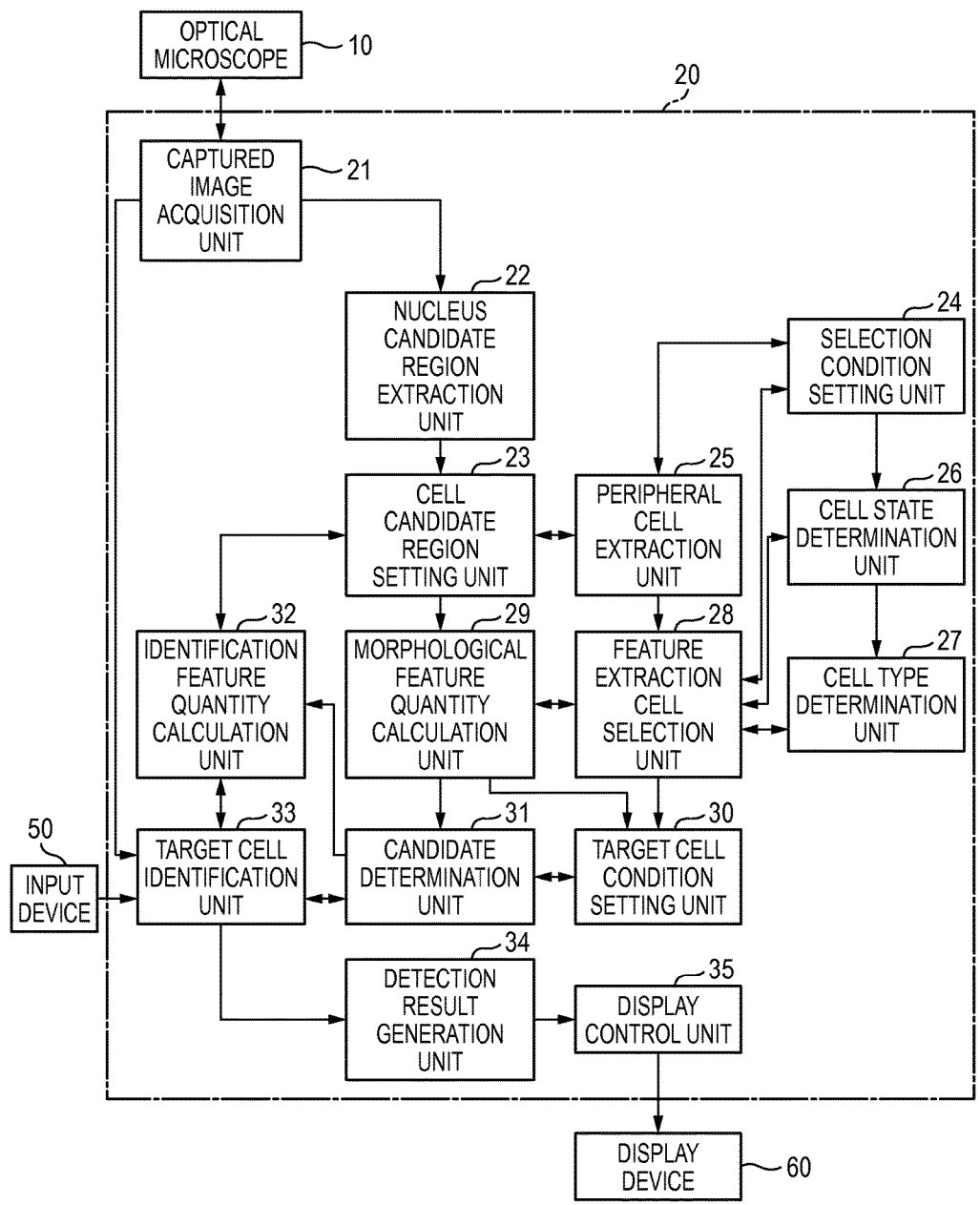
FIG. 2 is a functional block diagram of an image processing device.

FIG. 2 is a functional block diagram of the image processing device 20. As shown in FIG. 2, the image processing device 20 includes a captured image acquisition unit 21, a nucleus candidate region extraction unit 22, a cell candidate region setting unit 23, a selection condition setting unit 24, a peripheral cell extraction unit 25, a cell state determination unit 26, a cell type determination unit 27, a feature extraction cell selection unit 28, a morphological feature quantity calculation unit 29, a target cell condition setting unit 30, a candidate determination unit 31, an identification feature quantity calculation unit 32, a target cell identification unit 33, a detection result generation unit 34, and a display control unit 35.

The functions of the respective units in the image processing device 20 may be realized when a computer including control means, such as a CPU, storage means, such as a memory, input/output means for transmitting and receiving data to and from an external device, and the like reads and executes a program stored in a computer-readable information recording medium. It should be noted that the program may be supplied to the image processing device 20 as a computer by an information recording medium, such as an optical disk, a magnetic disk, a magnetic tape, a magneto-optical disk, or a flash memory, or may be supplied to the image processing device 20 through a data communication network, such as Internet.

The captured image acquisition unit 21 acquires captured images obtained by imaging a sample using the CCD camera 14 in the optical microscope 10 from the optical microscope 10. It should be noted that images acquired by the captured image acquisition unit 21 may be displayed on the display device 60 by the display control unit 35.

The nucleus candidate region extraction unit 22 extracts a candidate region of a nucleus based on pixels having color (RGB value) or concentration within a predefined range in each captured image acquired by the captured image acquisition unit 21. For example, the nucleus candidate region extraction unit 22 may binarize the pixels in the captured image by a predefined threshold value of color (or concentration), and specifically, may extract pixels having color (or concentration) darker than the threshold value (or equal to or greater than the threshold value) as a black pixel. The nucleus candidate region extraction unit 22 may calculate a plurality of sets (pixel groups) by connecting the pixel extracted from each image acquired by the captured image acquisition unit 21 and may set a rectangular parallelepiped region circumscribed to each set as a nucleus candidate region.

The cell candidate region setting unit 23 sets a cell candidate region to be a possible candidate of the target cell inside the captured image acquired by the captured image acquisition unit 21 based on the nucleus candidate region extracted by the nucleus candidate region extraction unit 22. Hereinafter, a specific example of processing by the cell candidate region setting unit 23 will be described.

The cell candidate region setting unit 23 estimates the possible range of a cell size based on the projection size of the nucleus candidate region extracted by the nucleus candidate region extraction unit 22 onto the slide glass surface and a predefined relational expression. For example, the cell candidate region setting unit 23 may estimate the possible range (for example, a rectangular region) of the nucleated red blood cell on the slide glass surface based on the relational expression between a nucleus and the size of a cell in the nucleated red blood cell. Specifically, the cell candidate region setting unit 23 sets the rectangular region in the estimated range centering on one point in the nucleus candidate region as a cell presence region.

The cell candidate region setting unit 23 sets a cell candidate region likely to include the target cell based on the nucleus candidate region extracted by the nucleus candidate region extraction unit 22 and the estimated cell presence region on the slide glass surface.

Figure 3:
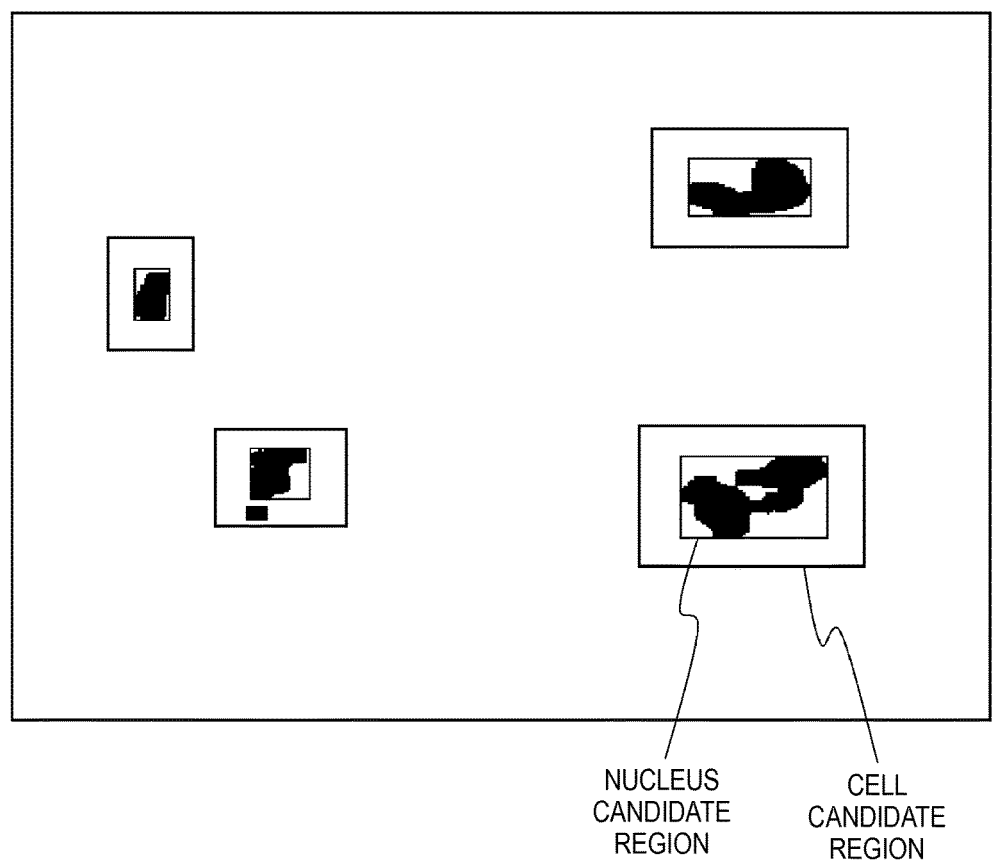
FIG. 3 is a diagram showing an example of a nucleus candidate region and a cell candidate region.

FIG. 3 shows an example of a nucleus candidate region extracted by the nucleus candidate region extraction unit 22 and a cell candidate region set by the cell candidate region setting unit 23. In FIG. 3, a circumscribed rectangle to a black pixel group is a nucleus candidate region, and a rectangular region provided outside the nucleus candidate region is a cell candidate region.

The selection condition setting unit 24 sets a condition of a cell to be extracted and selected as a peripheral cell of a cell candidate region. For example, the selection condition setting unit 24 may set an extraction region of a peripheral cell centering on a cell candidate region of interest. The extraction region of the peripheral cell may be the entire captured image or may be a range at a designated distance centering on the cell candidate region of interest. The selection condition setting unit 24 may designate a condition of a cell to be selected among cells extracted from the extraction region of the peripheral cell. For example, the condition of the cell may be defined by the designation of at least one of the type of the cell and the state of the cell. It should be noted that the type of the cell may be one of a nucleated cell and an anucleated cell, and the state of the cell may be one of a dense state in which other cells abut around and a solitary state in which no other cells abut. The selection condition setting unit 24 may set a section condition based on information received from the input device.

The peripheral cell extraction unit 25 extracts a plurality of image regions (cell regions) included in the extraction region from the extraction region of the peripheral cell set by the selection condition setting unit 24 for the cell candidate region of interest. For example, the peripheral cell extraction unit 25 may perform contour detection in an image included in the extraction region of the peripheral cell and may extract each cell region based on the detected contour. The peripheral cell extraction unit 25 may extract the detected contour or a rectangular region surrounding the contour as a cell region, or when a contour is further included inside the contour, may extract a cell region based on the outermost contour.

Figure 4A:
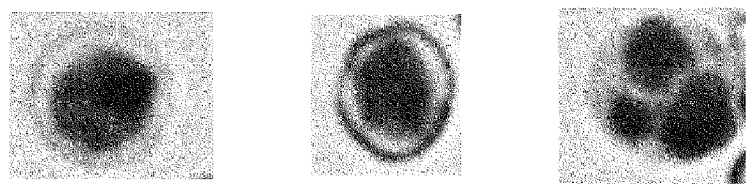
FIG. 4A is a diagram showing an example of a cell in a solitary state.
Figure 4B:
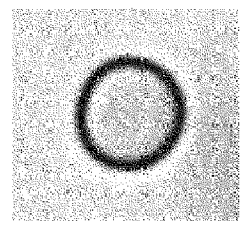
FIG. 4B is a diagram showing an example of a cell in a dense state.

The cell state determination unit 26 determines the state of the cell included in the cell region based on the cell region extracted by the peripheral cell extraction unit 25. For example, the cell state determination unit 26 may calculate the circularity (curvature) of the cell (contour) included in the cell region, when the calculated circularity is equal to or greater than a threshold value (that is, when the shape is close to a circle), may determine that the cell is in a solitary state, and may determine that the cell is in a dense state otherwise. It should be noted that FIGS. 4A and 4B show an example of cells in a solitary state and a dense state. FIG. 4A shows an example of a cell in a solitary state, and FIG. 4B shows an example of a cell in a dense state.

Figure 5A:
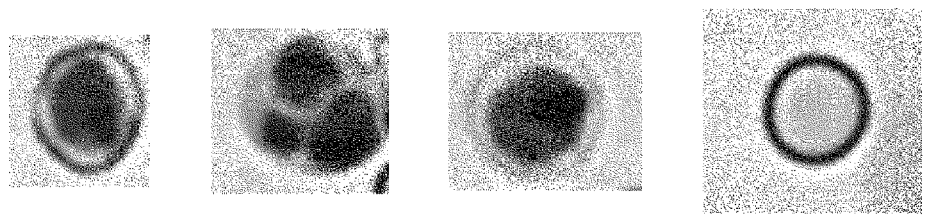
FIG. 5A is a diagram showing an example of a nucleated cell.
Figure 5B:
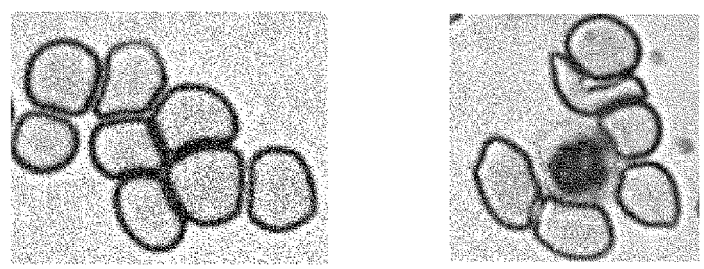
FIG. 5B is a diagram showing an example of an anucleated cell.

The cell type determination unit 27 determines the type of the cell included in the cell region based on the cell region extracted by the peripheral cell extraction unit 25. For example, the cell type determination unit 27 may determine that the cell is a nucleated cell when a nucleus candidate region is included in the cell region and that the cell is an anucleated cell otherwise, or may determine that the cell is a nucleated cell when a contour is detected in the cell region and that the cell is an anucleated cell otherwise. It should be noted that FIGS. 5A and 5B show an example of a nucleated cell and an anucleated cell. FIG. 5A shows an example of a nucleated cell, and FIG. 5B shows an example of an anucleated cell.

The feature extraction cell selection unit 28 selects a cell region satisfying the selection condition set by the selection condition setting unit 24 among the cell regions extracted by the peripheral cell extraction unit 25. For example, the feature extraction cell selection unit 28 selects a cell region, for which the cell state and the cell type determined by the cell state determination unit 26 and the cell type determination unit 27 satisfy the condition set by the selection condition setting unit 24, among the cell regions extracted by the peripheral cell extraction unit 25 and outputs the selected cell region to the morphological feature quantity calculation unit 29. It should be noted that, when the condition of the cell is not designated by the selection condition setting unit 24, the extracted cell region may be output to the morphological feature quantity calculation unit 29 along with information of the cell type and the cell state thereof.

The morphological feature quantity calculation unit 29 calculates a morphological feature quantity of the cell region selected by the feature extraction cell selection unit 28. For example, the morphological feature quantity calculation unit 29 may calculate a morphological feature quantity from a region obtained by expanding the cell region input from the feature extraction cell selection unit 28 by a constant multiple up and down and right and left. As the morphological feature quantity, one of the area (A) of a nucleus included in the cell region, the area (B) of a cell included in the cell region, and the area ratio (A/B) between the nucleus and the cell may be used. It should be noted that the area of the nucleus may be calculated as the area of the nucleus candidate region included in the cell region (or the area in the contour detected from the inside of the cell region), and the area of the cell may be calculated as the area in the contour of the cell region. The morphological feature quantity calculation unit 29 outputs the morphological feature quantity obtained from the cell region satisfying the condition to the target cell condition setting unit 30 for each condition of the cell (for example, the combination of the cell type and the cell state).

Figure 6:
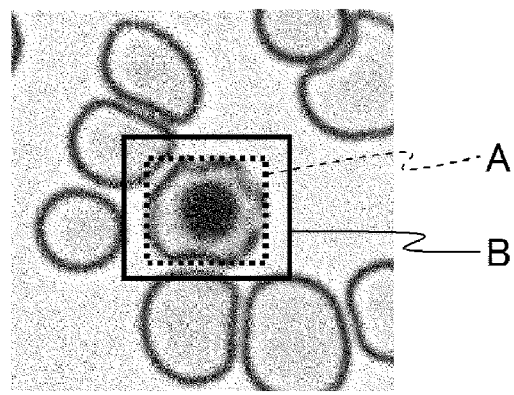
FIG. 6 is a diagram illustrating a calculation example of a morphological feature quantity.
Figure 7:
FIG. 7 is a diagram illustrating a calculation example of a morphological feature quantity.
Figure 8:
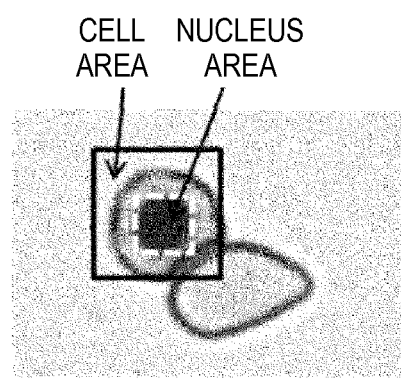
FIG. 8 is a diagram illustrating a calculation example of a morphological feature quantity.

FIGS. 6 to 8 are diagrams illustrating a calculation example of a morphological feature quantity. In FIG. 6, if a dotted line portion is a cell region A, a morphological feature quantity is calculated from a region B obtained by expanding the cell region by a constant multiple up and down and right and left. At this time, as shown in FIG. 7, the area of the cell may be calculated from a region where the contour constitutes a closed region in the outermost contour among the contours detected from the inside of the set region B. As shown in FIG. 8, the ratio between the area (cell area) of a rectangular region set in the cell and the area (nucleus area) of a rectangular region set in the nucleus region may be calculated as the area ratio between the cell and the nucleus.

The target cell condition setting unit 30 sets a condition to be satisfied by the morphological feature quantity obtained from the image region including the target cell based on the morphological feature quantity of the cell region calculated by the morphological feature quantity calculation unit 29. For example, the target cell condition setting unit 30 sets the condition (specifically, the following first to fourth target cell conditions) to be satisfied by the morphological feature quantity obtained from the image region including the target cell in the following manner based on the condition of the cell and the morphological feature quantity obtained from the cell region satisfying the condition.

First, the first target cell condition will be described. When the condition of the cell is designated such that the type of the cell is a nucleated cell and the state of the cell is a solitary state, the target cell condition setting unit 30 calculates an average value (or median or the like) C1 of the morphological feature quantities obtained from the cell regions satisfying the condition and sets $X \leq C1$ for a morphological feature quantity X calculated from the image region of the target cell as the first target cell condition. This is based on the size of a nucleated red blood cell being smaller than a white blood cell which is a nucleated cell other than the nucleated red blood cell.

Next, the second target cell condition will be described. When the condition of the cell is designated such that the type of the cell is a nucleated cell and the state of the cell is a dense state, the target cell condition setting unit 30 calculates an average value (or a median or the like) C2 of the morphological feature quantities obtained from the cell regions satisfying the condition and sets $X \leq C2$ for the morphological feature quantity X calculated from the image region of the target cell as the second target cell condition. This is based on the size of a nucleated red blood cell being smaller than a white blood cell which is a nucleated cell other than the nucleated red blood cell.

Next, the third target cell condition will be described. When the condition of the cell is designated such that the type of the cell includes an anucleated cell and the state of the cell is a solitary state, the target cell condition setting unit 30 calculates an average value (or a median or the like) C3 of the morphological feature quantities obtained from the cell regions satisfying the condition, sets a range of $C3min < C3 < C3max$, and sets $C3min \leq X \leq C3max$ for the morphological feature quantity X calculated from the image region of the target cell as the third target cell condition. This is based on the size of a nucleated red blood cell being average with respect to an anucleated cell. It should be noted that the range of $C3min \leq C3 \leq C3max$ may be defined such that a cell region having a predefined ratio belongs to the range.

Next, the fourth target cell condition will be described. When the condition of the cell is designated such that the type of the cell includes an anucleated cell and the state of the cell is a dense state, the target cell condition setting unit 30 calculates an average value (or a median or the like) C4 of the morphological feature quantities obtained from the cell regions satisfying the condition, sets a range of $C4min < C4 < C4max$, and sets $C4min \leq X \leq C4max$ for the morphological feature quantity X calculated from the image region of the target cell as the fourth target cell condition. This is based on the size of a nucleated red blood cell being average with respect to an anucleated cell. It should be noted that the range of C4min<C4<C4max may be defined such that a cell region having a predetermined ratio belongs to the range.

The candidate determination unit 31 determines whether or not to be a candidate for detecting a target cell from the cell candidate region set by the cell candidate region setting unit 23 based on the morphological feature quantity of the cell candidate region and the target cell condition set by the target cell condition setting unit 30. For example, the candidate determination unit 31 may select a target cell condition based on the state (solitary state or dense state) of the cell candidate region and may determine whether or not to be a candidate for detecting a target cell based on the selected target cell condition and the morphological feature quantity of the cell candidate region. Specifically, when the state of the cell candidate region is a solitary state, the candidate determination unit 31 may select the first or third target cell condition, and when the one or both the selected target cell conditions are satisfied, may determine the cell candidate region as a candidate for detecting a target cell. When the state of the cell candidate region is a dense state, the candidate determination unit 31 may select the second or fourth target cell condition, and when one or both of the selected target cell conditions are satisfied, may determine the cell candidate region as a candidate for detecting a target cell.

The identification feature quantity calculation unit 32 enlarges or reduces the cell candidate regions set as the detection object of the target cell by the candidate determination unit 31 to a designated image size and then calculates an identification feature quantity in the cell candidate regions. The identification feature quantity is an image feature quantity for learning and identification for use in learning processing and identification processing by the target cell identification unit 33, and for example, an HOG feature quantity may be used. For example, the HOG feature quantity may be calculated as follows. First, an object image is divided into B blocks each having A cells, luminance gradient direction histograms ([the value of a first gradient direction, the value of a second gradient direction, . . . , the value of an N-th gradient direction]) are obtained from the luminance gradient direction and luminance gradient intensity in the plane (X direction and Y direction) of an image for the respective cells of each block, and normalization is performed in terms of blocks such that the square mean of the luminance gradient direction histograms becomes 1. Thereafter, A×N values created by combining the normalized luminance gradient direction histograms in the block are set as the feature quantities of the block, and A×B×N values created by combining all blocks in the object image are set as the HOG feature quantities of the object image. It should be noted that the identification feature quantity and the morphological feature quantity may be constituted as different feature quantities or may be constituted as the same feature quantity.

The identification feature quantity calculation unit 32 calculates the identification feature quantity in the input captured images and then outputs the calculated identification feature quantity to the target cell identification unit 33.

The target cell identification unit 33 identifies whether or not a cell included in the cell candidate region is a target cell based on the identification feature quantity calculated in the cell candidate region set as the object for detecting the target cell by the candidate determination unit 31 and learning parameters learned in advance. It should be noted that the learning processing in the target cell identification unit 33 may be performed as follows.

The target cell identification unit 33 receives designation of an image region for use in learning processing in an image acquired by the captured image acquisition unit 21. The designation of the image region may be performed through the input device 50. For example, when learning identification between the target cell (nucleated red blood cell) and other images, the target cell identification unit 33 receives an image region with the target cell in the captured images as a positive example and an image region with no target cell as a negative example. Then, the target cell identification unit 33 generates learning parameters based on the identification feature quantity calculated by the identification feature quantity calculation unit 32 for the image regions of the positive example and the negative example.

The detection result generation unit 34 generates an image region including the cell candidate region detected to the target call and information of the coordinate of the image region based on the processing result of the target cell identification unit 33. A control signal for controlling the optical microscope 10 may be output to the optical microscope 10 such that the imaging range of the optical microscope 10 is moved to the coordinate generated by the detection result generation unit 34.

The display control unit 35 outputs display control information for displaying the image region and the coordinate generated by the detection result generation unit 34 to the display device 60. With this, the image region detected to be the target cell and the coordinate of the image region are displayed on the display device 60.

Next, the flow of processing in the image processing device 20 will be described referring to flowcharts shown in FIGS. 9 to 13.

[Overall Flow of Detection Processing of Target Cell]

First, the flow of processing for detecting a target cell will be described referring to a flowchart shown in FIG. 9.

Figure 9:
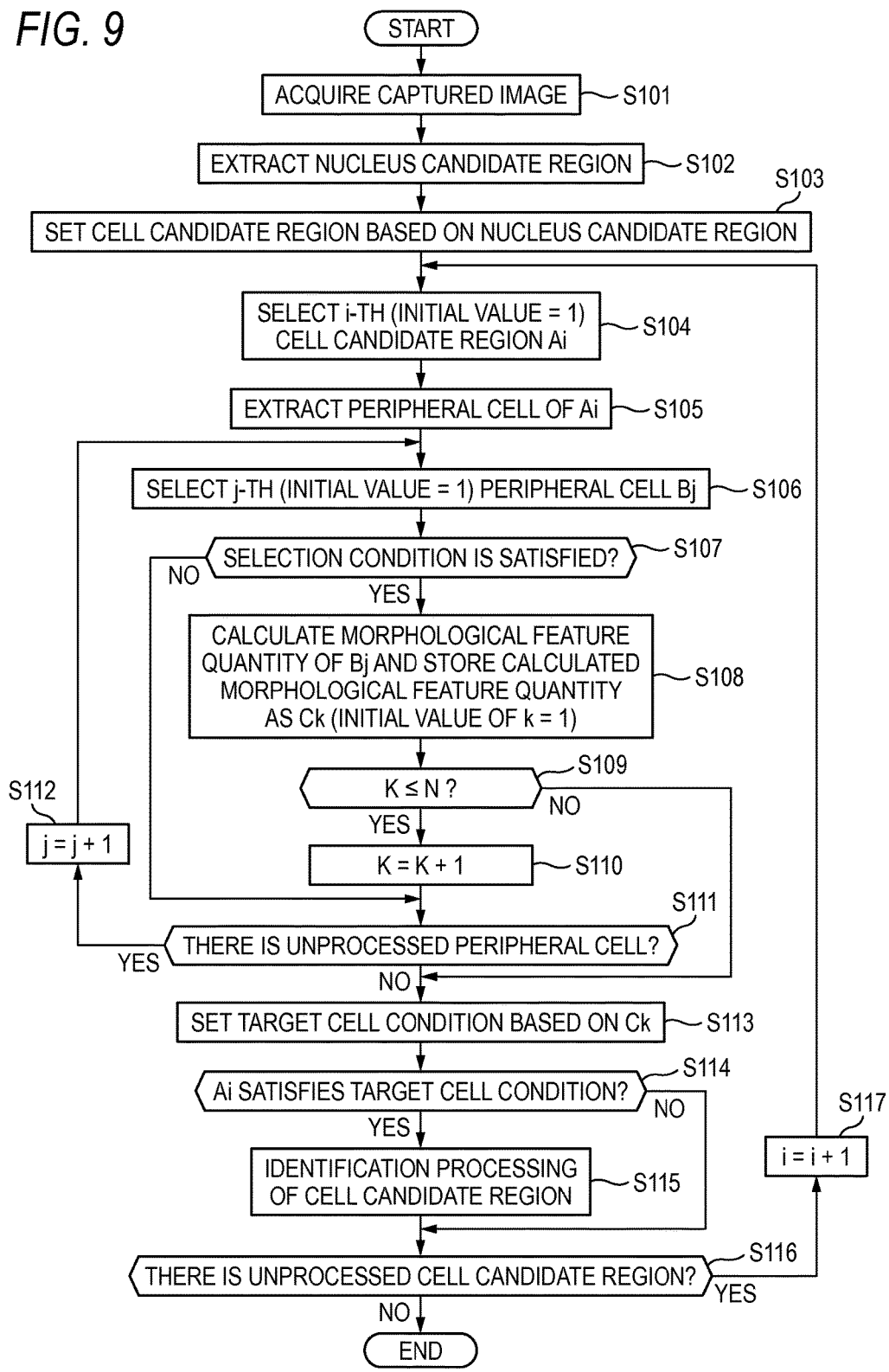
FIG. 9 is a flowchart of processing for detecting a target cell.

As shown in FIG. 9, the image processing device 20 acquires captured images to be processed (S101), and performs binarization processing on each of the acquired captured images. Next, the image processing device 20 extracts a nucleus candidate region to be a possible nucleus of the target cell in the captured images after the binarization processing (S102), and sets a cell candidate region based on the set nucleus candidate region (S103).

The image processing device 20 selects an i-th cell candidate region Ai where an initial value of a variable i is 1 (S104), and extracts a peripheral cell (cell region) of the cell candidate region Ai (S105).

The image processing device 20 selects a j-th peripheral cell Bj when an initial value of a variable j is 1 (S106), and when the selected peripheral cell Bj satisfies a defined selection condition of a cell (S107: Y), calculates the morphological feature quantity of the peripheral cell Bj, and stores the morphological feature quantity as Ck (an initial value of a variable k is 1) (S108). The selection condition of the cell may be designated by the cell type (nucleated cell or anucleated cell) and the cell state (dense state or solitary state). The details of the processing of S108 will be described below.

When variable k is equal to or less than a predefined threshold value N (S109: Y), the image processing device 20 increments k (S110). After S110 or in S107, when the peripheral cell Bj does not satisfy the defined selection condition of the cell (S107: N), the image processing device 20 determines whether or not there is an unprocessed peripheral cell (S111). When there is an unprocessed peripheral cell (S111: Y), j increments (S112), and the process returns to S106.

In S109, when the variable k is not equal to or less than the predefined threshold value N (S109: N), or in S111, when there is no unprocessed peripheral cell (S111: N), the image processing device 20 sets the condition (target cell condition) related to the morphological feature quantity of the target cell based on the stored morphological feature quantity Ck (S113). The details of the processing of S113 will be described below.

The image processing device 20 calculates the morphological feature quantity of the cell candidate region Ai, and when it is determined that the cell candidate region Ai satisfies the target cell condition based on the calculated morphological feature quantity (S114: Y), executes identification processing for identifying whether or not a target cell is included in the cell candidate region Ai (S115). The details of the processing of S115 will be described below.

After S115 or in S114, when it is determined that the cell candidate region Ai does not satisfy the target cell condition (S114: N), the image processing device 20 determines whether or not there is an unprocessed cell candidate region (S116). When it is determined that there is an unprocessed cell candidate region (S116: Y), i increments (S117), and the process returns to S104. When it is determined that there is no unprocessed cell candidate region (S116: N), the process ends. It should be noted that, after it is determined that there is no unprocessed cell candidate region (S116: N), an image region determined to include a target cell may be displayed on the display device.

[Storage Processing of Morphological Feature Quantity]

Next, the details of processing related to S108 of FIG. 9 will be described referring to the flowchart shown in FIG. 10.

Figure 10:
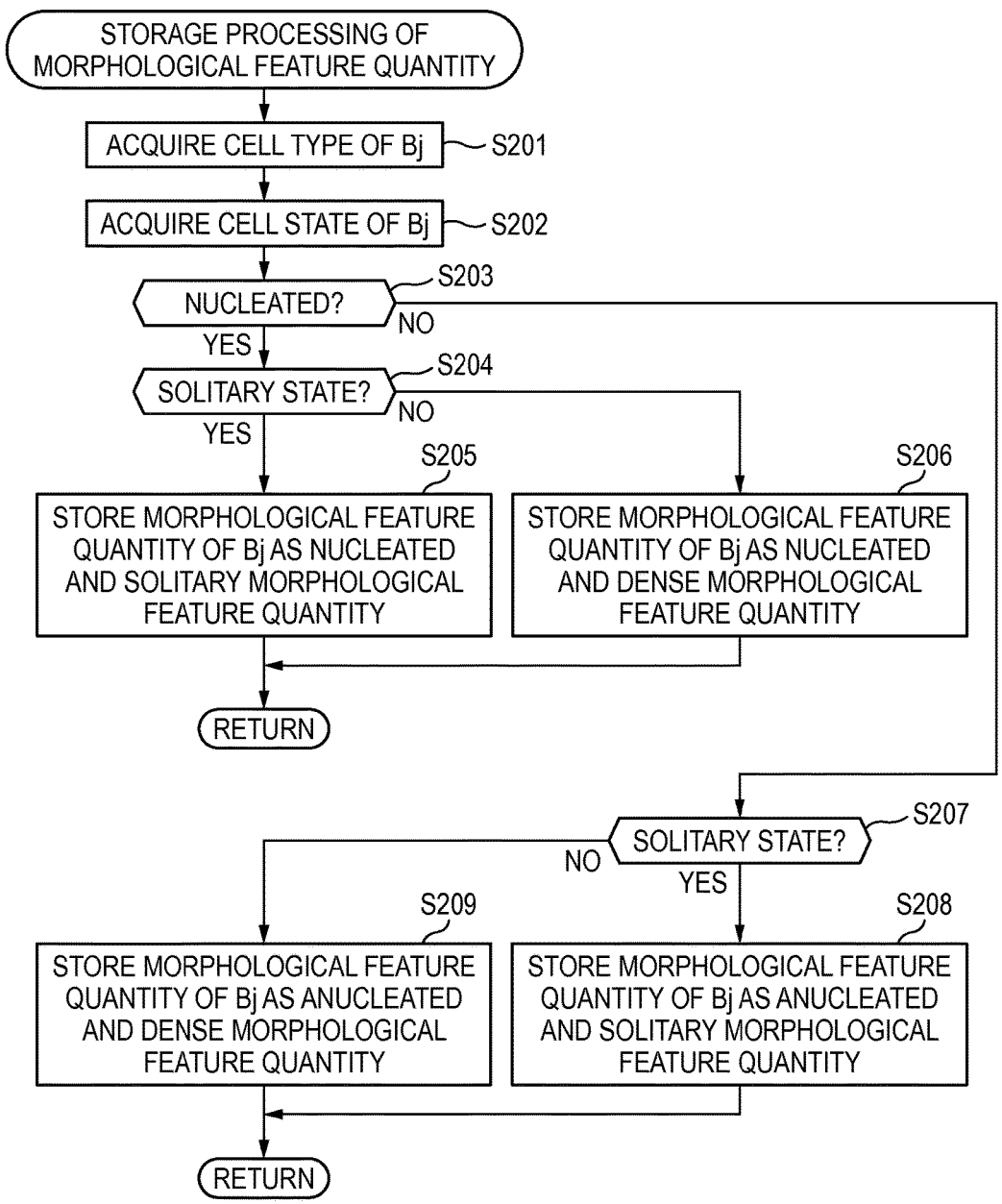
FIG. 10 is a flowchart of storage processing of a morphological feature quantity.

As shown in FIG. 10, the image processing device 20 acquires the cell type of a peripheral cell Bj based on the determination result of the cell type determination unit 27 (S201), and acquires the cell state of the peripheral cell Bj based on the determination result of the cell state determination unit 26 (S202).

Next, when the cell type of the peripheral cell Bj is a nucleated cell (S203: Y), and the cell state of the peripheral cell Bj is a solitary state (S204: Y), the image processing device 20 stores the morphological feature quantity of Bj as a nucleated and solitary morphological feature quantity (S205), and performs return.

When the cell type of the peripheral cell Bj is a nucleated cell (S203: Y), and the cell state of the peripheral cell Bj is a dense state (not a solitary state) (S204: N), the image processing device 20 stores the morphological feature quantity of Bj as a nucleated and dense morphological feature quantity (S206), and performs return.

When the cell type of the peripheral cell Bj is not a nucleated cell (S203: N), and the cell state of the peripheral cell Bj is a solitary state (S207: Y), the image processing device 20 stores the morphological feature quantity of Bj as an anucleated and solitary morphological feature quantity (S208), and performs return.

When the cell type of the peripheral cell Bj is not a nucleated cell (S203: N), and the cell state of the peripheral cell Bj is a dense state (not a solitary state) (S207: N), the image processing device 20 stores the morphological feature quantity of Bj as an anucleated and dense morphological feature quantity (S209), and performs return.

[Setting Processing of Target Cell Condition]

Next, the details of processing related to S113 of FIG. 9 will be described referring to the flowchart shown in FIG. 11.

Figure 11:
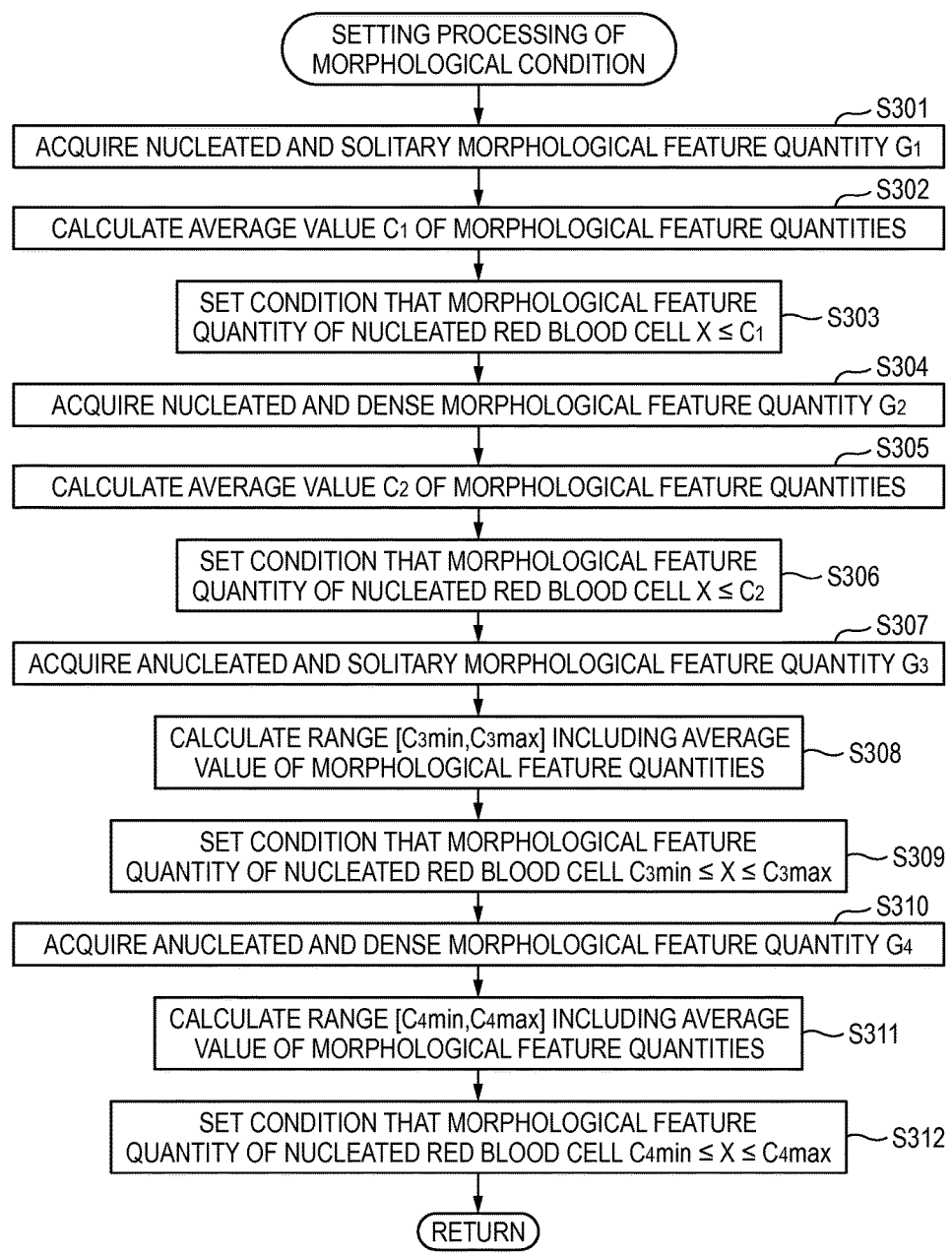
FIG. 11 is a flowchart of setting processing of a target cell condition.

As shown in FIG. 11, the image processing device 20 acquires a set G1 of nucleated and solitary morphological feature quantities among the stored morphological feature quantities of the peripheral cell (S301), and calculates an average value C1 (or a median) of the elements of the acquired set G1 (S302). In regards to a morphological feature quantity X of a nucleated red blood cell (target cell), the image processing device 20 sets X≤C1 as a condition to be satisfied by the morphological feature quantity of the target cell in a solitary state (S303).

Next, the image processing device 20 acquires a set G2 of nucleated and dense morphological feature quantities among the stored morphological feature quantities of the peripheral cell (S304), and calculates an average value C2 (or a median) of the elements of the acquired set G2 (S305). In regards to the morphological feature quantity X of the nucleated red blood cell (target cell), the image processing device 20 sets X≤C2 as a condition to be satisfied by the morphological feature quantity of the target cell in a dense state (S306).

The image processing device 20 acquires a set G3 of anucleated and solitary morphological feature quantities among the stored morphological feature quantities of the peripheral cell (S307), and calculates a range [C3min, C3max] including an average value C3 (or a median) of the elements of the acquired set G3 (S308). In regards to the morphological feature quantity X of the nucleated red blood cell (target cell), the image processing device 20 sets C3min≤X≤C3max as a condition to be satisfied by the morphological feature quantity of the target cell in the solitary state (S309).

The image processing device 20 acquires a set G4 of anucleated and solitary morphological feature quantities among the stored morphological feature quantities of the peripheral cell (S310), and calculates a range [C4min, C4max] including an average value C4 (or a median) of the elements of the acquired set G4 (S311). In regards to the morphological feature quantity X of the nucleated red blood cell (target cell), the image processing device 20 sets C4min≤X≤C4max as a condition to be satisfied by the morphological feature quantity of the target cell in the solitary state (S312), and performs return. In the above-described flow, although an example where the target cell conditions for all combinations of the cell types of nucleated and anucleated and the cell states of solitary and dense are set has been described, a target cell condition for at least one of the combinations or the target cell conditions for the cell states of solitary and dense to either nucleate or anucleated.

[Detection Candidate Determination Processing of Target Cell]

Next, the details of processing related to S114 of FIG. 9 will be described referring to the flowchart shown in FIG. 12.

Figure 12:
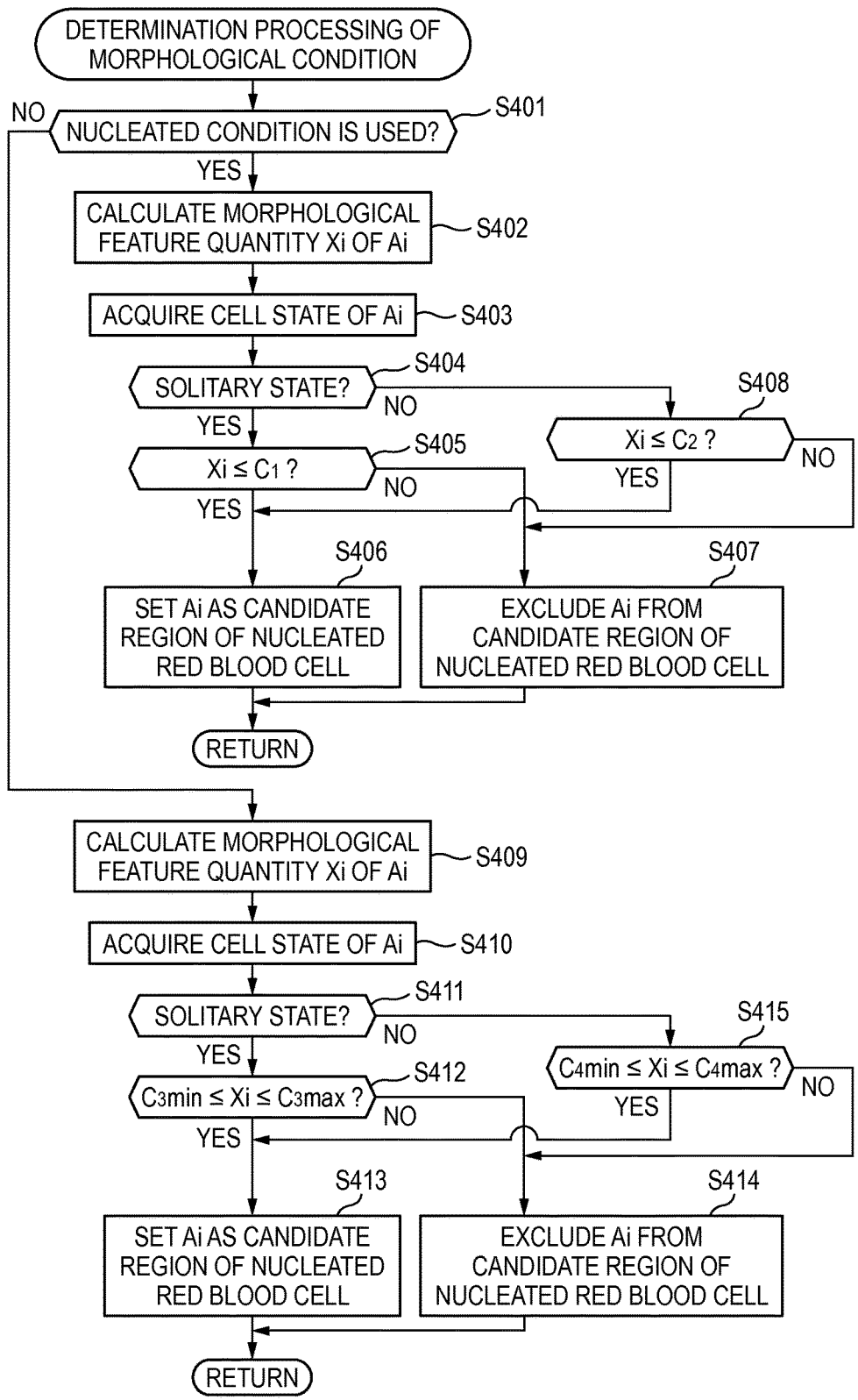
FIG. 12 is a flowchart of detection candidate determination processing of a target cell.

As shown in FIG. 12, when the target cell condition for a nucleated cell is used (S401: Y), the image processing device 20 executes the following processing.

The image processing device 20 calculates a morphological feature quantity Xi of a cell candidate region Ai (S402), and acquires the cell state of the cell candidate region Ai based on the determination result of the cell state determination unit 26 (S403).

When the cell state of the cell candidate region Ai is a solitary state (S404: Y), the image processing device 20 determines whether or not Xi is equal to or less than C1 (S405), when Xi is equal to or less than C1 (S405: Y), sets the cell candidate region Ai as a candidate region of a nucleated red blood cell (target cell) (S406), when Xi is greater than C1 (S405: N), excludes the cell candidate region Ai from the candidate region of the nucleated red blood cell (target cell) (S407), and performs return.

When the cell state of the cell candidate region Ai is a dense state (not a solitary state) (S404: N), the image processing device 20 determines whether or not Xi is equal to or less than C2 (S408), when Xi is equal to or less than C2 (S408: Y), sets the cell candidate region Ai as a candidate region of a nucleated red blood cell (target cell) (S406), when Xi is greater than C2 (S408: N), excludes the cell candidate region Ai from the candidate region of the nucleated red blood cell (target cell) (S407), and performs return.

When the target cell condition for a nucleated cell is not used (S401: N), the image processing device 20 executes the following processing.

The image processing device 20 calculates the morphological feature quantity Xi of the cell candidate region Ai (S409), and acquires the cell state of the cell candidate region Ai based on the determination result of the cell state determination unit 26 (S410).

When the cell state of the cell candidate region Ai is a solitary state (S411: Y), the image processing device 20 determines whether or not Xi is equal to or greater than C3min and equal to or less than C3max (S412). When Xi is equal to or greater than C3min and equal to or less than C3max (S412: Y), the cell candidate region Ai is set as a candidate region of a nucleated red blood cell (target cell) (S413). When Xi is not equal to or greater than C3min and equal to or less than C3max (S412: N), the cell candidate region Ai is excluded from the candidate region of the nucleated red blood cell (target cell) (S414), and return is performed.

When the cell state of the cell candidate region Ai is a dense state (not a solitary state) (S411: N), the image processing device 20 determines whether or not Xi is equal to or greater than C4min and equal to or less than C4max (S415). When Xi is equal to or greater than C4min and equal to or less than C4max (S415: Y), the cell candidate region Ai is set as a candidate region of a nucleated red blood cell (target cell) (S413). When Xi is not equal to or greater than C4min and equal to or less than C4max (S415: N), the cell candidate region Ai is excluded from the candidate region of the nucleated red blood cell (target cell) (S414), and return is performed.

[Identification Processing of Target Cell]

Next, the details of processing related to S115 of FIG. 9 will be described referring to the flowchart shown in FIG. 13.

Figure 13:
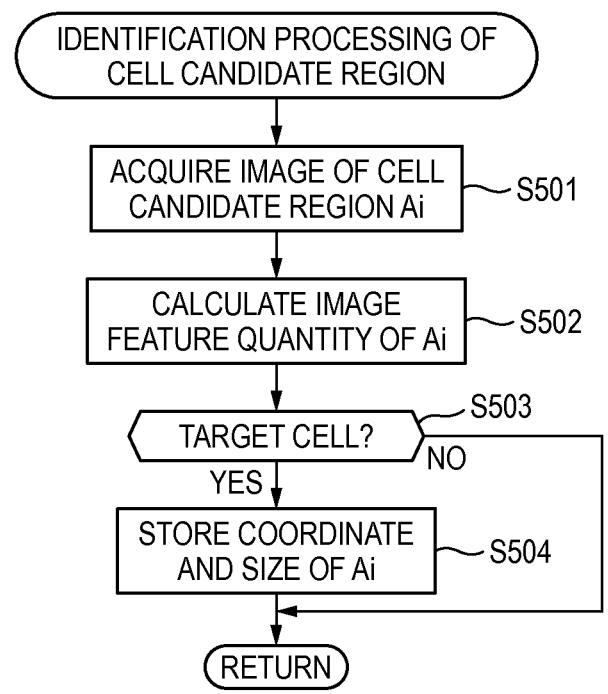
FIG. 13 is a flowchart of identification processing of a target cell.

As shown in FIG. 13, the image processing device 20 acquires an image of the cell candidate region Ai satisfying the target cell condition (S501), and calculates image feature quantity (identification feature quantity) of the cell candidate region Ai based on the acquired image (S502). It is determined whether or not a target cell is included in the cell candidate region Ai based on the image feature quantity calculated in S502 by an identification unit learned in advance (S503), when the target cell is included (S503: Y), the coordinate and size of the cell candidate region Ai are stored (S504), and return is performed. When the target cell is not included (S503: N), return is performed.

According to the image processing system 1 described above, the reference of the target cell according to the individual is set based on the cells around the cell candidate region, and image candidates likely to be the target cell are refined based on the set reference, whereby the determination precision of the target cell is improved compared to a case where refinement is not performed.

The invention is not limited to the above-described embodiment. For example, it may be determined by the target cell identification unit 33 whether or not each of the cell candidate regions is the target cell, and as a result, it may be determined by the candidate determination unit 31 whether or not the cell candidate region determined to be the target cell is a candidate of the target cell. It may be determined that the target cell is included in the cell candidate region determined to be a candidate of the target cell by the candidate determination unit 31. The target cell condition may be generated without depending on the state of the cell. The target cell is not limited to NRBCs, and other cells may be used as the target cell.

INDUSTRIAL APPLICABILITY

The image processing device, the image processing method, the computer-readable medium, and the image processing system according to the invention are useful for mechanically detecting cells, such as NRBCs.

Although the invention has been described in detail or referring to the specific embodiment, it is apparent to those skilled in the art that various changes and modifications can be added without departing from the spirit and scope of the invention.

This application is based on Japanese Patent Application No. 2012-184106, filed on Aug. 23, 2012, the content of which is incorporated herein by reference.

REFERENCE SIGNS LIST

1: image processing system, 10: optical microscope, 11: slide glass, 12: objective lens, 13: focusing mechanism, 14: CCD camera, 20: image processing device, 21: captured image acquisition unit, 22: nucleus candidate region extraction unit, 23: cell candidate region setting unit, 24: selection condition setting unit, 25: peripheral cell extraction unit, 26: cell state determination unit, 27: cell type determination unit, 28: feature extraction cell selection unit, 29: morphological feature quantity calculation unit, 30: target cell condition setting unit, 31: candidate determination unit, 32: identification feature quantity calculation unit, 33: target cell identification unit, 34: detection result generation unit, 35: display control unit, 50: input device, 60: display device

The invention claimed is:

1. An image processing device comprising:
a memory configured to store at least one program; and
a processor configured to execute the at least one program to implement:
　a setting unit that sets an object region for detecting a target cell in each of captured images obtained by imaging a sample including the target cell;
　an extraction unit that extracts a plurality of cell regions from a peripheral region including a region different from the object region;
　a range setting unit that sets a range of a feature quantity of the target cell based on a feature quantity obtained from each of the plurality of cell regions; and
　a determination unit that determines whether or not the target cell is included in the object region in response to determining that a feature quantity obtained from the object region is included in the range of the feature quantity set by the range setting unit.

2. The image processing device according to claim 1, wherein the extraction unit extracts a plurality of cell regions each having a nucleus from the peripheral region including the region different from the object region, and the range setting unit sets the range of the feature quantity of the target cell equal to or less than a threshold value set in the range of the feature quantity obtained from each of the plurality of cell regions in terms of a feature quantity representing the size of at least one of a cell and a nucleus.

3. The image processing device according to claim 2, wherein the feature quantity is at least one of a cell area, a nucleus area, and a cell-to-nucleus area ratio.

4. The image processing device according to claim 1, further comprising:

a state determination unit that determines whether a cell included in each cell region extracted by the extraction unit is in a dense state or in a solitary state, wherein the range setting unit sets a range of a feature quantity of the target cell for each cell state determined by the state determination unit, and the determination unit determines whether or not the target cell is included in the object region when the feature quantity obtained from the object region is included in the range of the feature quantity set by the range setting unit for the state of the cell included in the object region.

5. The image processing device according to claim 1, wherein the range setting unit sets the range of the feature quantity of the target cell equal to or less than an average value or a median of the feature quantity obtained from each of the plurality of cell regions.

6. The image processing device according to claim 1, further comprising:

a learning unit that mechanically learns an identification condition for identifying the target cell based on sample images corresponding to a positive example and a negative example of the target cell, wherein the determination unit determines whether or not the target cell is included in the object region based on the identification condition when the feature quantity obtained from the object region is included in the range of the feature quantity set by the range setting unit.

7. The image processing device according to claim 1, wherein the target cell is a nucleated red blood cell having a nucleus, the image processing device further comprises a region extraction unit that extracts a nucleus candidate region to be a candidate of the nucleus from the plurality of captured images based on at least one of the color and concentration of the nucleus, and the setting unit sets the object regions based on the range of the possible size of the nucleus candidate region and the target cell.

8. An image processing method which causes a computer to execute a process comprising:

setting an object region for detecting a target cell in each of captured images obtained by imaging a sample including the target cell;

extracting a plurality of cell regions each including a cell from a peripheral region including a region other than the object region;

setting a range of a feature quantity of the target cell based on a feature quantity obtained from each of the plurality of cell regions; and determining whether or not the target cell is included in the object region in response to determining that a feature quantity obtained from the object region is included in the set range of the feature quantity set.

9. A non-transitory computer readable medium which stores a program causing a computer to execute a process for image processing, the process comprising:

setting an object region for detecting a target cell in each of captured images obtained by imaging a sample including the target cell;

extracting a plurality of cell regions each including a cell from a peripheral region including a region other than the object region;

setting a range of a feature quantity of the target cell based on a feature quantity obtained from each of the plurality of cell regions; and determining whether or not the target cell is included in the object region in response to determining that a feature quantity obtained from the object region is included in the set range of the feature quantity.

10. An image processing system comprising:

an image processing device;

an optical microscope that is connected to the image processing device; and a display device that is connected to the image processing device, wherein the image processing device comprises, a memory configured to store at least one program; and a processor configured to execute the at least one program to implement:

a setting unit that sets an object region for detecting a target cell in each of captured images obtained by imaging a sample including the target cell;

an extraction unit that extracts a plurality of cell regions each including a cell from a peripheral region including a region different from the object region;

a range setting unit that sets a range of a feature quantity of the target cell based on a feature quantity obtained from each of the plurality of cell regions; and a determination unit that determines whether or not the target cell is included in the object region in response to determining that a feature quantity obtained from the object region is included in the range of the feature quantity set by the range setting unit.

* * * * *